United States Patent
DeGrazia et al.

(10) Patent No.: US 8,462,191 B2
(45) Date of Patent: Jun. 11, 2013

(54) AUTOMATIC SUPPRESSION OF IMAGES OF A VIDEO FEED IN A VIDEO CALL OR VIDEOCONFERENCING SYSTEM

(75) Inventors: Brad DeGrazia, Seattle, WA (US); Steve Olivier, Seattle, WA (US); Alan D. Gatzke, Bainbridge Island, WA (US)

(73) Assignee: Cisco Technology, Inc., San Jose, CA (US)

( * ) Notice: Subject to any disclaimer, the term of this patent is extended or adjusted under 35 U.S.C. 154(b) by 263 days.

(21) Appl. No.: 12/961,220

(22) Filed: Dec. 6, 2010

(65) Prior Publication Data

US 2012/0140015 A1 Jun. 7, 2012

(51) Int. Cl.
*H04N 7/15* (2006.01)

(52) U.S. Cl.
USPC .................. 348/14.01; 348/14.08; 348/14.09

(58) Field of Classification Search
USPC ............................................ 348/14.01–14.16
See application file for complete search history.

(56) References Cited

U.S. PATENT DOCUMENTS

| | | | |
|---|---|---|---|
| 6,894,714 B2 | 5/2005 | Gutta et al. | |
| 7,847,815 B2 | 12/2010 | Patel et al. | |
| 8,044,989 B2 * | 10/2011 | Mareachen | 348/14.08 |
| 2007/0140532 A1 | 6/2007 | Goffin | |
| 2007/0153091 A1 * | 7/2007 | Watlington et al. | 348/208.14 |
| 2007/0188596 A1 | 8/2007 | Kenoyer | |
| 2007/0188597 A1 | 8/2007 | Kenoyer | |
| 2007/0188598 A1 | 8/2007 | Kenoyer | |
| 2007/0188599 A1 | 8/2007 | Kenoyer | |
| 2008/0193020 A1 | 8/2008 | Sibiryakov et al. | |
| 2008/0267578 A1 * | 10/2008 | Zhang et al. | 386/52 |
| 2010/0085415 A1 | 4/2010 | Rahman | |
| 2011/0063440 A1 * | 3/2011 | Neustaedter et al. | 348/143 |

* cited by examiner

*Primary Examiner* — Melur Ramakrishnaiah
(74) *Attorney, Agent, or Firm* — Brinks Hofer Gilson & Lione

(57) ABSTRACT

In one embodiment, a method for determining whether to suppress images of a video feed in a video call or videoconference is provided. A communications server receives a first video feed from a first client and determines whether a face is present in images of the first video feed. The communication server determines whether to suppress images of the first video feed from a second video feed based on whether a face is detected in images of the first video feed. The communication server suppresses images of the first video feed from the second video feed in response to determining to suppress images of the first video feed and disseminates the second video feed to a second client.

15 Claims, 3 Drawing Sheets

AUTOMATIC SUPPRESSION OF IMAGES OF A VIDEO FEED IN A VIDEO CALL OR VIDEOCONFERENCING SYSTEM

BACKGROUND

The present embodiments relate to automatic suppression of images of a video feed in a video call or videoconferencing system.

Video enabled calls and video conferencing are desirable unified communication and collaboration features. Users convey non-verbal elements in video enabled calls and video conferencing that are not easily conveyed over other communication mediums, such as audio teleconferencing. However, users are often hesitant to enable video during communications because, for example, a user may be multitasking during a collaboration session and does not want to broadcast their video when the user is not speaking or performing another task. Accordingly, video communication systems are desirable that are able to automatically suppress images of a video feed during a video call or videoconference based on the interactions of a user with a camera.

DESCRIPTION OF EXAMPLE EMBODIMENTS

Figure 1:
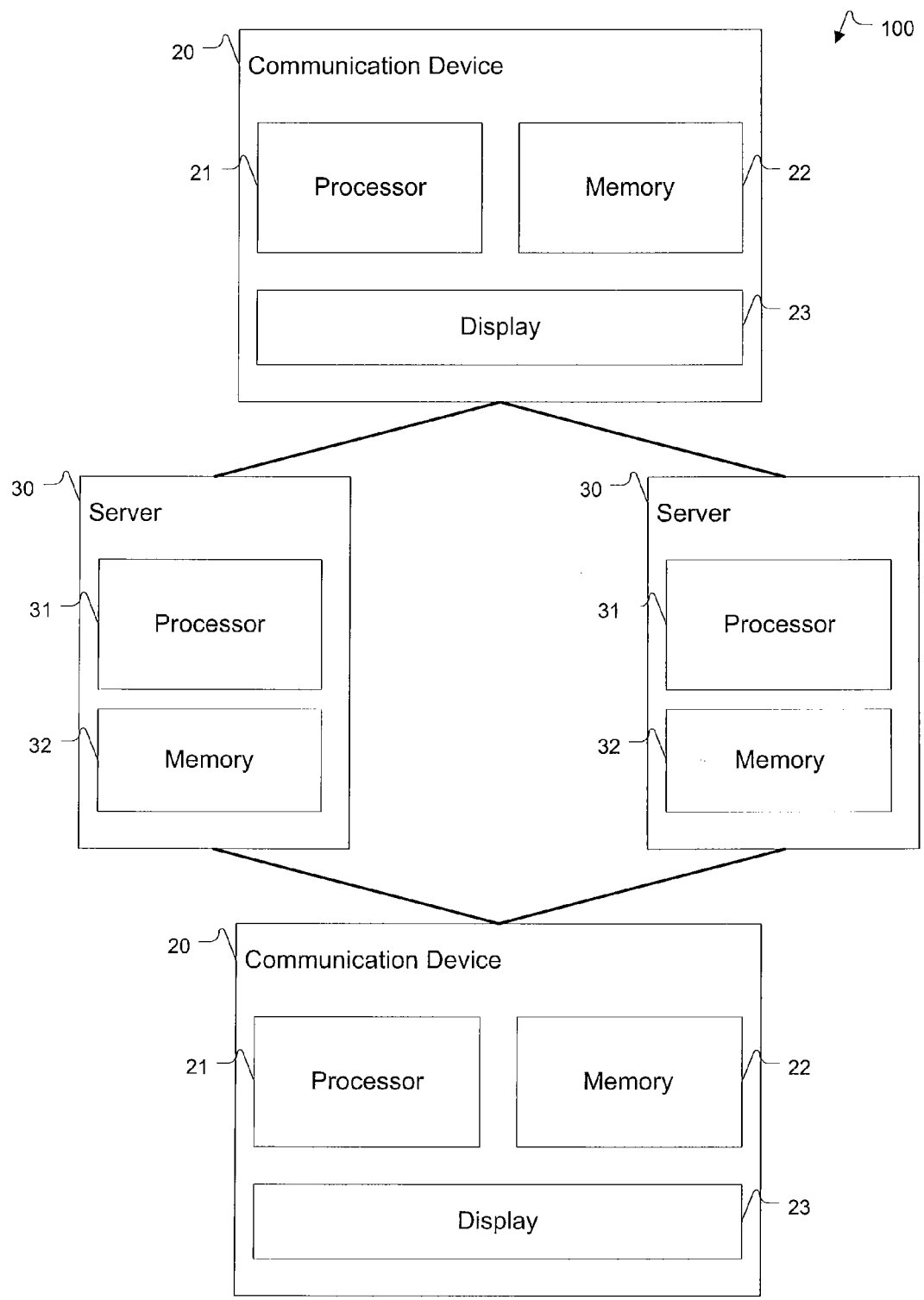
FIG. 1 illustrates one implementation of a communication system.

The present embodiments relate to automatic suppression of images of a video feed in a video call or videoconferencing system. Generally, a video communication system examines images of a video feed to determine whether a face is present using, for example, face tracking technology and/or face recognition technology. When a face is not present in images of the video feed, the video communication system suppresses images from the video feed. However, when a face is present in images of the video feed, the video communication system determines whether to suppress images from the video feed based on, for example, whether the face is looking towards a camera associated with the video feed, a degree to which a face is looking towards a camera associated with the video feed, an amount of time a face is looking away from a camera associated with the video feed, and whether a user associated with the video feed is speaking. It will be appreciated that by automatically suppressing images of a video feed when a user associated with the video feed is not actively participating in a video call or video teleconference, the video communication system may conserve resources such as bandwidth.

In one aspect, a method is provided. The method may include a video call or videoconferencing system receiving a first video feed from a first client. A determination is made of whether a face is present in images of the first video feed and a determination is made of whether to suppress images of the first video feed from a second video feed based on whether a face is detected in images of the first video feed. Images of the first video feed are suppressed from the second video feed in response to a determination to suppress images of the first video feed. The second video feed may then be disseminated to a second client.

In a second aspect, software encoded in one or more computer-readable media is provided. When executed, the software is operable to receive a first video feed from a first client and detect whether a face is present in images of the first video feed. The software is further operable when executed to determine whether to suppress images of the first video feed from a second video feed based on whether a face is detected in images of the first video feed and to suppress images of the first video feed from the second video feed in response to determining to suppress images of the first video feed. The software is further operable when executed to disseminate the second video feed to a second client.

In a third aspect, an apparatus is provided. The apparatus may include a memory including a set of instructions and a processor in communication with the memory. The processor is configured to execute the set of instructions stored in the memory. The set of instructions direct the processor to receive a first video feed from a first client and detect whether a face is present in images of the first video feed. The set of instructions further direct the processor to determine whether to suppress images of the first video feed from a second video feed based on whether a face is detected in images of the first video feed; to suppress images of the first video feed from the second video feed in response to determining to suppress images of the first video feed; and to disseminate the second video feed to a second client.

FIG. 1 illustrates one implementation of a system that may include video call or videoconferencing systems able to automatically suppress images of a video feed. The communication system 100 may include communication devices 20 (also known as clients) and servers 30. The system 100 is a network, communication system, remote terminal system, or any other system for providing communication or service.

The servers 30 may include a processor 31 and memory 32, and may be a collaboration server, a server of a call agent/softswitch/VoIP PBX, an instant messaging server, email server, exchange server, information router, content router, RRS threaded discussion group or any now known or later developed device for providing communication service. The servers 30 provide communication service to the communication devices 20. Communication service may include phone service, video messaging service, video conferencing service, conferencing service, electronic mail service, instant message service, SMS, voice mail service, calendar service, any combination thereof, or any now known or later developed communication service.

The communication devices 20 and servers 30 may communicate with each other using a protocol, telephone line, wireless device, wire (cable), any combination thereof, or any other now known or later developed communication technique. The communication may be direct or indirect.

The communication device 20 includes a processor 21, memory 22, and display device 23. Additional, different, or fewer components may be provided. For example, the communication device 20 may include an input device, such as a keyboard, mouse, microphone, joystick, or camera.

The communication device 20 is a workstation, personal computer, laptop computer, personal digital assistant (PDA), remote terminal device, telephone, cellular telephone, handheld device, portable device, camera, music player, or other now known or later developed communication device. The communication device 20 is a device for receiving, transmitting, and managing communication. The communication device 20 may be used for the transmission of signs, signals (including control signals), writing, images and sounds or intelligence of any nature.

The communication device 20 may be associated with a user (e.g., operator), such as being registered to the user, owned by the user, associated with user as rule, operating on the user's behalf, and/or generally used by the user. Communication services for a user may be transmitted to associated communication devices 20. For example, a user may be registered for phone and email service. The phone and email service may be sent to some, none, or all of the communication devices 20 associated with the user.

The processors 21 and 31 are general processors, digital signal processors, application specific integrated circuits, field programmable gate arrays, analog circuits, digital circuits, combinations thereof, or other now known or later developed processors. The processors 21 and 31 may be single devices or combinations of devices, such as associated with a network or distributed processing. Any of various processing strategies may be used, such as multi-processing, multi-tasking, parallel processing, remote processing, centralized processing or the like. The processors 21 and 31 are responsive to instructions stored as part of software, hardware, integrated circuits, firmware, micro-code or the like.

Generally, a server 30 receives a video feed from a communication device 20 (also known as a client). The server 30 examines the images of the video feed to determine whether a face is present in the images of the video feed. The server 30 may then determine whether to suppress images of the first video feed from a second video feed based on factors such as whether a face is detected in images of the first video feed; whether a detected face is looking towards or away from a camera associated with the communication device; an amount of time a detected face is looking away from a camera associated with the communication device; and/or whether a user associated with the communication device is speaking.

For example, in some implementations the server 30 may determine to suppress images from the first video feed when a face is not present in images of the first video feed and determine not to suppress images from the first video feed when a face is present in images of the first video feed. Further, in some implementations the server 30 may determine to suppress images from the first video feed when a face is present in images of the first video feed but is looking away from a camera associated the communication device. Similarly, the server 30 may determine to suppress images from the first video feed when a face is present in images of the first video feed but looking away from a camera associated with the communication device for more than a defined period of time. In some implementations, the server 30 may additionally determine not to suppress images from the first video feed when a face is looking away from a camera associated with the communication device but a user associated with the communication device is speaking.

When the server 30 determines not to suppress images of the first video feed from the second video feed, the server 30 may integrate images of the first video feed into the second video feed and disseminate the second video feed to one or more other communication devices 20. However, when the server 30 determines to suppress images of the first video feed from the second video feed, the server 30 suppresses images of the first video feed from the second video feed and disseminates the second video feed to one or more other communication devices 20. It will be appreciated that in the present application, disseminating a video feed may mean actions such as communicating a video feed, transmitting a video feed, or propagating a video feed.

Figure 2:
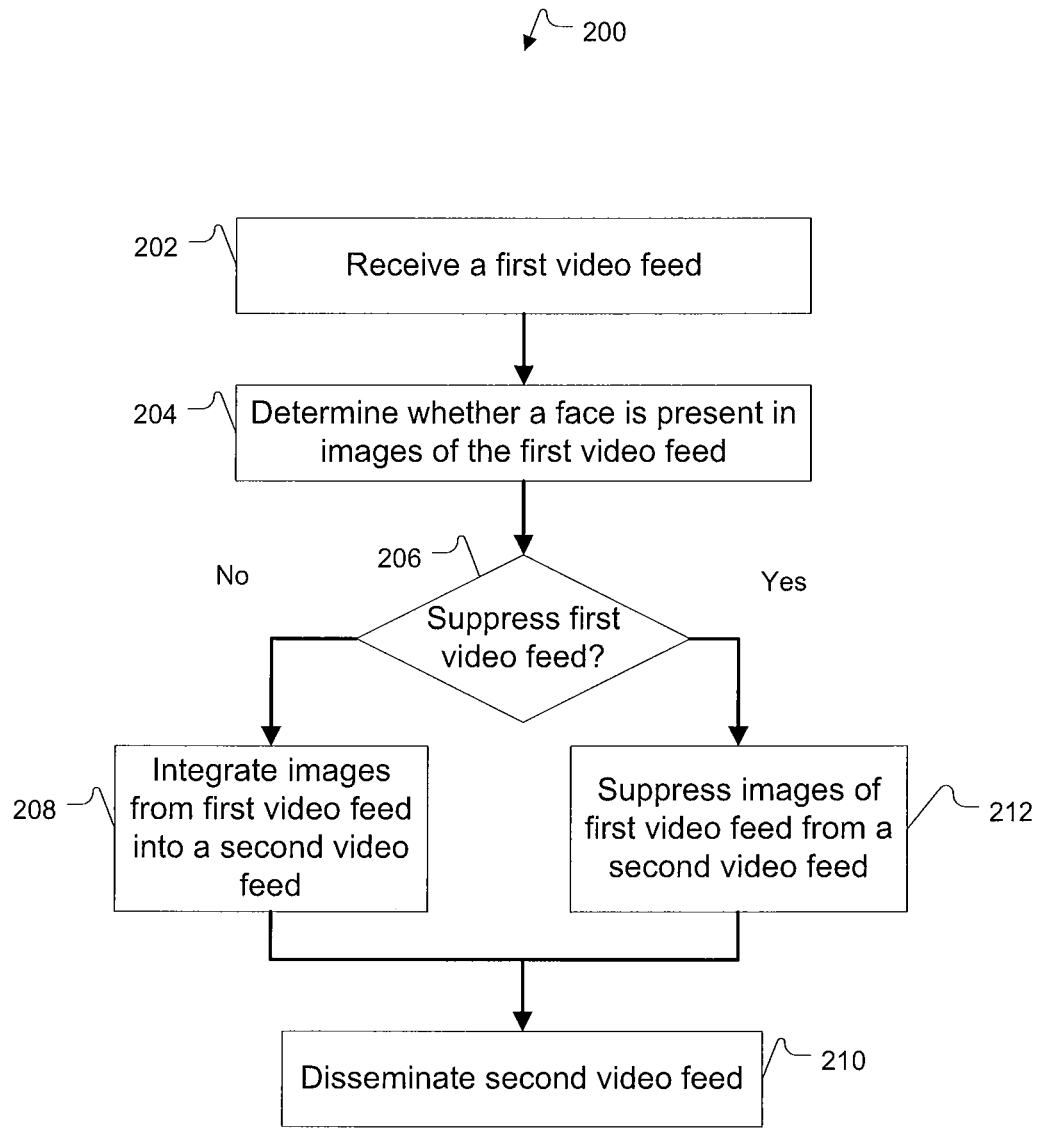
FIG. 2 illustrates a flow chart of one method for suppressing images of a video feed in a video call or videoconferencing system.

FIG. 2 is a flow chart of a method for suppressing images of a video feed in a video call or videoconferencing system. The method 200 begins at step 202 with a server receiving a first video feed from a first communication device (also known as a client). The server may receive the video feed as part of, for example, a video call or a teleconference that includes video.

At step 204, the server determines whether a face is present in images of the first video feed. In some implementations, the server may utilize face tracking technologies and/or face recognition technologies, such as Principal Component Analysis with eigenface, Linear Discriminate Analysis, Elastic Bunch Graph Matching fisherface, the Hidden Markov model, or dynamic link matching, to determine whether a face is present in images of the first video feed. At step 206, the server determines whether to suppress images of the first video feed from a second video feed based on whether a face is present in images of the video feed, using a method such as the method described below with respect to FIG. 3.

Figure 3:
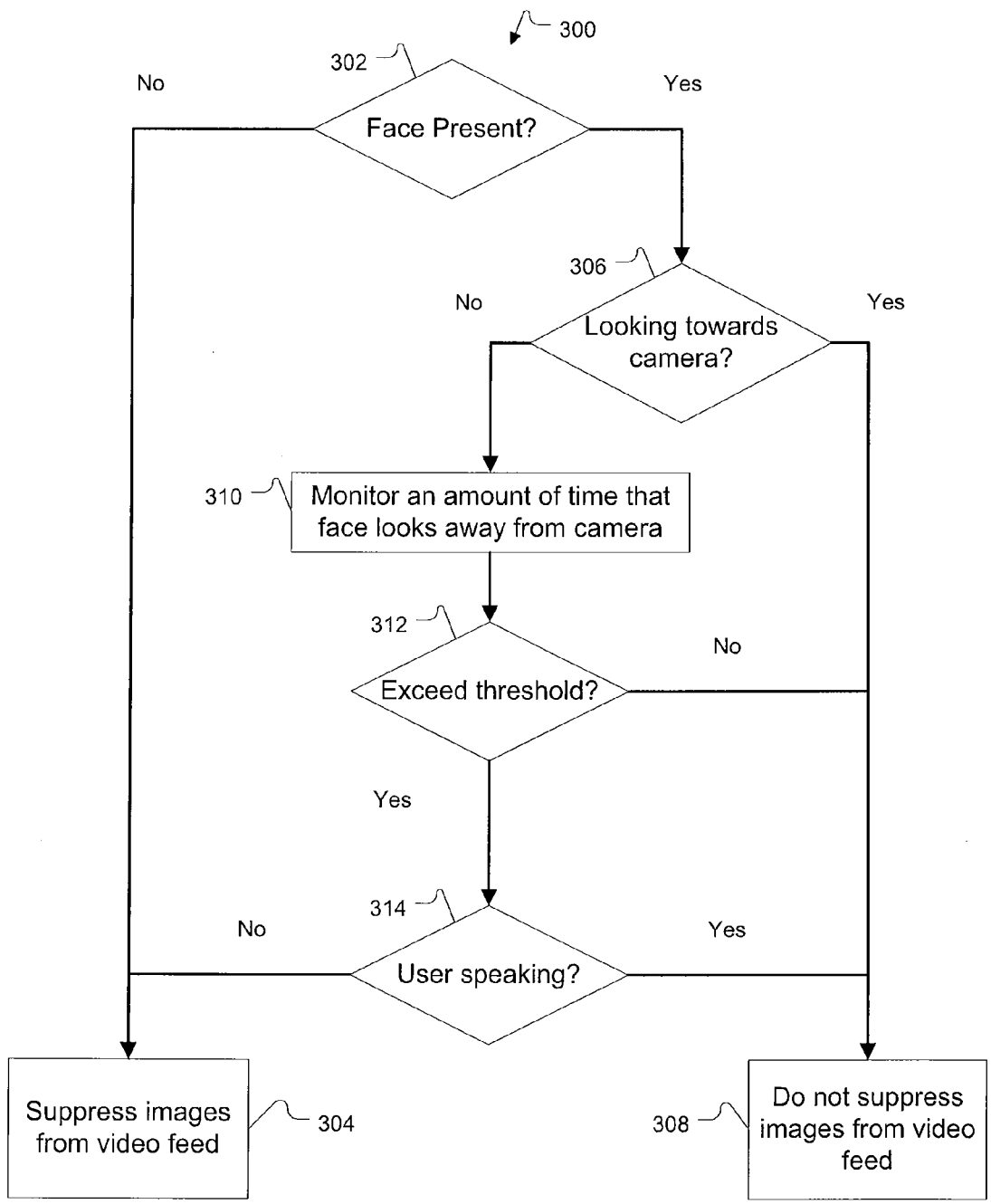
FIG. 3 illustrates a flow chart of one method for determining whether to suppress images of a first video feed from a second video feed based on whether a face is detected in images of the first video feed.

FIG. 3 is a flow chart of one method for determining whether to suppress images of a first video feed from a second video feed based on whether a face is present in images of the first video feed. At step 302, a server determines whether a face is present in images of the first video feed. If a face is not present in images of the first video feed, at step 304 the server determines to suppress images of the first video feed. However, if a face is present in images of the first video feed, the server determines a position of the face with respect to a camera associated with the first communication device at step 306.

At step 306, the server determines a position of the face with respect to the camera by determining whether a face in the images of the first video feed is looking towards the camera associated with the first communication device or looking away from the camera associated with the first communication device. It will be appreciated that in some implementations, the server determines whether a face is looking towards or away from the camera by utilizing face tracking technology and/or face recognition technology to determine a degree to which a face is turned away from the camera.

If the server determines that a face is looking towards the camera, at step 308 the server determines not to suppress images of the first video feed. However, if the server determines that a face is looking away from the camera, at step 310 the server may monitor an amount of time that the face is looking away from the camera. At step 312, the server determines whether the amount of time that the face looks away from the camera exceeds a threshold.

While the amount of time that the face looks away from the camera does not exceed the threshold, the server determines not to suppress images of the first video feed at step 308. In some implementations, the server may dynamically change the threshold based on current network conditions. For example, during normal network conditions, the server may determine whether the face looks away from the camera for more than a standard threshold, such as ten seconds. However, during periods of heavy network usage, the server may reduce the threshold such that the server may determine whether the face looks away from the camera more than a reduced threshold, such as five second.

When the amount of time the face looks away from the camera exceeds the threshold, at step 314 the server determines whether a user associated with video feed is speaking. In some implementations the server determines whether the user associated with the video feed is speaking by detecting audio associated with the user in the video feed or by detecting audio associated with the user in a distinct audio feed that is associated with the video feed. In other implementations, the server determines whether the user associated with the video feed is speaking using face tracking technology and/or face recognition technology.

If the server determines the user associated with the first video feed is speaking, at step 308 the server determines not to suppress images of the first video feed. However, if the server determines the user associated with the first video feed is not speaking, at step 304 the server determines to suppress images of the first video feed.

It will be appreciated that the method for determining whether to suppress images of a first video feed from a second video feed based on whether a face is present in images of the first video feed described above with respect to FIG. 3 may be modified by removing one or more of the above-described steps or adding additional steps.

Referring again to FIG. 2, if the server determines at step 206 to not suppress images of the first video feed, at step 208 the server may integrate images of the first video feed into a second video feed, and at step 210, the server disseminates the second video feed to one or more communication devices. Alternatively, if the server determines at step 206 to suppress images of the first video feed, at step 212 the server suppresses images of the first video feed from the second video feed, and at step 210, the server disseminates the second video feed to one or more communication devices. In some implementations, the one or more communication devices that receive the second video feed include the first communication device, where in other implementations, the one or more communication devices that receive the second video feed does not include the first communication device.

The server may continually processes the first video feed using the methods described above with respect to FIGS. 2 and 3 to automatically suppress images of the first video feed when the user associated with the first communication device is not actively participating in a video call or videoconference, and to disseminate images from the first video feed when the user is actively participating in the video call or videoconference.

FIGS. 1-3 teach embodiments for the automatic suppression of images of a video feed in a video call or videoconferencing system. As discussed above, a video communication system examines images of a video feed to determine whether a face is present. When a face is not present in images of the video feed, the video communication system suppresses images from the video feed. However, when a face is present in images of the video feed, the video communication system determines whether to suppress images from the video feed based on, for example, whether the face is looking towards a camera associated with the video feed, a degree to which a face is looking towards a camera associated with the video feed, an amount of time a face is looking away from a camera associated with the video feed, and whether a user associated with the video feed is speaking.

It will be appreciated that while in the embodiments described above a server receives a video feed from a communication device and determines whether to suppress images from the video, the same operations may be performed at a communication device. For example, a communication device may examine images of a video feed associated with the communication device to determine whether a face is present in the images of the video feed. When a face is not present in images of the video feed, the communication device may determine to suppress images of the video feed and the communication device does not transmit the video feed to a communications server.

Similarly, when a face is present in images of the video feed, the communications system determines whether to suppress images of the video and whether to transmit images of the video feed to a communication server based on, for example, whether the face is looking towards a camera associated with the video feed, a degree to which a face is looking towards a camera associated with the video feed, an amount of time a face is looking away from a camera associated with the video feed, and whether a user associated with the video feed is speaking.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

The invention claimed is:

1. A method comprising:
   receiving a first video feed from a first client;
   detecting with a processor whether a face is present in images of the first video feed;
   determining a position of the face with respect to a camera associated with the first client with the processor in response to detection of the face in the images of the first video feed;
   determining whether to suppress the images of the first video feed from a second video feed with the processor based on whether the face is detected in the images of the first video feed, wherein determining whether to suppress the images of the first video feed from the second video feed comprises determining whether to suppress the images of the first video feed from the second video feed based on the position of the face with respect to the camera associated with the first client;
   suppressing the images of the first video feed from the second video feed with the processor in response to a determination to suppress the images of the first video feed; and
   disseminating the second video feed to a second client.

2. The method of claim 1, wherein determining whether to suppress the images of the first video feed from the second video feed based on the position of the face with respect to the camera associated with the first client comprises:
   determining to suppress the images of the first video feed from the second video feed in response to determining the face is looking away from the camera.

3. The method of claim 1, wherein determining whether to suppress the images of the first video feed from the second video feed based on the position of the face with respect to the camera associated with the first client comprises:
   determining not to suppress the images of the first video feed from the second video feed in response to determining the face is looking at the camera.

4. The method of claim 1, further comprising:
   determining whether a user associated with the first video feed is speaking;
   wherein determining whether to suppress the images of the first video feed from the second video feed based on the position of the face with respect to the camera associated with the first client comprises:
   determining whether to suppress the images of the first video feed from the second video feed based on the position of the face with respect to the camera associated with the first client and whether the user associated with the first video feed is speaking.

5. The method of claim 4, wherein determining whether to suppress the images of the first video feed from the second video feed based on the position of the face with respect to the camera associated with the first client and whether the user associated with the first video feed is speaking comprises:
  determining not to suppress the images of the first video feed from the second video feed in response to determining the face is looking away from the camera and the user is associated with the first video feed is speaking.

6. The method of claim 1, further comprising:
  monitoring an amount of time that the face is looking away from the camera in response to determining the face is looking away from the camera;
  wherein determining whether to suppress the images of the first video feed from the second video feed based on the position of the face with respect to the camera associated with the first client comprises:
    determining whether to suppress the images of the first video feed from the second video feed based on the amount of time that the face is looking away from the camera.

7. The method of claim 1 wherein determining whether to suppress the images of the first video feed from the second video feed based on whether a face is detected in the images of the first video feed comprises:
  determining not to suppress the images of the first video feed from the second video feed in response to determining the face is present in the images of the first video feed.

8. Software encoded in a non-transitory tangible computer-readable medium and when executed operable to:
  receive a first video feed from a first client;
  detect whether a face is present in images of the first video feed;
  determine a position of the face with respect to a camera associated with the first client in response to detection of the face in the images of the first video feed;
  determine whether to suppress the images of the first video feed from a second video feed based on whether the face is detected in the images of the first video feed, wherein a determination of whether to suppress the images of the first video feed from the second video feed comprises a determination of whether to suppress the images of the first video feed from the second video feed based on the position of the face with respect to the camera associated with the first client;
  suppress the images of the first video feed from the second video feed in response to a determination to suppress the images of the first video feed;
  integrate the images of the first video feed into the second video feed in response to a determination not to suppress the images of the first video feed; and
  disseminate the second video feed to a second client.

9. The software encoded in the non-transitory tangible computer-readable medium of claim 8, wherein when executed is further operable to determine whether a user associated with the first video feed is speaking; and
  wherein to determine whether to suppress images of the first video feed from the second video feed based on the position of the face with respect to the camera associated with the first client, when executed the software is further operable to:
    determine whether to suppress the images of the first video feed from the second video feed based on the position of the face with respect to the camera associated with the first client and whether the user associated with the first video feed is speaking.

10. The software encoded in the non-transitory tangible computer-readable medium of claim 9, wherein to determine whether to suppress the images of the first video feed from the second video feed based on the position of the face with respect to the camera associated with the first client and whether the user associated with the first video feed is speaking, when executed the software is further operable to:
  determine not to suppress the images of the first video feed from the second video feed in response to determining the face is looking away from the camera and the user associated with the first video feed is speaking.

11. The software encoded in the non-transitory tangible computer-readable medium of claim 8, wherein when executed the software is further operable to monitor an amount of time that the face is looking away from the camera in response to determining the face is looking away from the camera;
  wherein to determine whether to suppress the images of the first video feed from the second video feed based on the position of the face with respect to the camera associated with the first client, when executed the software is further operable to:
    determine whether to suppress the images of the first video feed from the second video feed based on the amount of time that the face is looking away from the camera.

12. An apparatus comprising:
  a memory including a set of instructions; and
  a processor in communication with the memory, the processor configured to execute the set of instructions stored in the memory, wherein the set of instructions direct the processor to:
    receive a first video feed from a first client;
    detect whether a face is present in images of the first video feed;
    determine a position of the face with respect to a camera associated with the first client in response to detection of the presence of the face in the first video feed;
    determine whether to suppress the images of the first video feed from a second video feed based on whether the face is detected in the images of the first video feed, wherein to determine whether to suppress the images of the first video feed from the second video feed, the set of instructions direct the processor to determine whether to suppress the images of the first video feed from the second video feed based on the position of the face with respect to the camera associated with the first client;
    suppress the images of the first video feed from the second video feed in response to a determination to suppress the images of the first video feed; and
    disseminate the second video feed to a second client.

13. The apparatus of claim 12, wherein the set of instructions further direct the processor to determine whether a user associated with the first video stream is speaking; and
  wherein to determine whether to suppress the images of the first video feed from the second video feed based on the position of the face with respect to the camera associated with the first client, the set of instructions direct the processor to:
    determine whether to suppress the images of the first video feed from the second video feed based on the position of the face with respect to the camera associated with the first client and whether the user associated with the first video feed is speaking.

14. The apparatus of claim 12, wherein to determine whether to suppress the images of the first video feed from the second video feed based on the position of the face with respect to the camera associated with the first client and whether a user associated with the first video feed is speaking, the set of instructions direct the processor to:
  determine not to suppress the images of the first video feed from the second video feed in response to determining the face is looking away from the camera and the user associated with the first video feed is speaking.

15. The apparatus of claim 12, wherein the set of instructions further direct the processor to monitor an amount of time that the face is looking away from the camera in response to determining the face is looking away from the camera; and
  wherein to determine whether to suppress the images of the first video feed from the second video feed based on the position of the face with respect to the camera associated with the first client, the set of instructions direct the processor to:
    determine whether to suppress the images of the first video feed from the second video feed based on the amount of time that the face is looking away from the camera.

* * * * *